3,469,991
HIGH PROTEIN PRODUCT AND PROCESS FOR PRODUCING SAME
Robert L. Hawley, Morgan Park, Ill., assignor to Libby, McNeill & Libby, Chicago, Ill., a corporation of Maine
No Drawing. Filed Feb. 2, 1966, Ser. No. 524,468
Int. Cl. A23j 1/14
U.S. Cl. 99—17                                               7 Claims

ABSTRACT OF THE DISCLOSURE

Preparation of a food product having a paste-like consistency by introducing oil-soluble flavoring material into oil containing unhydrated soy-protein particles.

---

This invention relates to high protein food products and more particularly to a proteinaceous product of paste-like consistency suitable for use as spreads prepared from soy-protein.

Peanut butter has long held a rather high portion of the consumer market due, in part, to its convenience, nutritive value, and pleasant flavor. It is conceivable that a food possessing similar texture and nutritive value, but having other flavors, would receive favorable recognition from the consuming public.

Researchers have attempted unsuccessfully for years to produce a protein type spread from purified soy protein. Failures have been due to the lack of a smooth mouth feel, excessive graininess and loss of/or diminution of flavors when added to the soy protein system.

In order to eliminate the graininess of products produced from soy-protein, water has been employed to solublize or soften the protein. The use of water, however, contains many disadvantages. Water forms a suitable environment for micro-biological growths, so that the product can not be stored without sterilization and/or refrigeration. Contamination of the product with micro-biological organisms occurs if the product is used as a spread, similar to peanut butter, in which a knife is repeatedly inserted, so that contamination occurs every time a knife is put to the product, and which with water present produces an unsanitary product.

Proteins and both natural and artificial flavors in water soluble form interact in an unknown manner to produce a diminished flavor level when tested organoleptically. To produce an acceptable flavor level in these systems it is sometimes necessary to add 10% to 15% of flavoring material based on total weight product. The production of acceptable flavors, therefore, has been for practical purposes prohibitively expensive.

It is therefore an object of the invention to eliminate graininess in protein products without the use of water or aqueous systems. It is another object of the present invention to provide a protein product which may be suitably flavored without using prohibitively large amounts of flavoring materials. It is still another object of the invention to provide a protein product which is suitable as a spread. It is yet another object of the invention to provide a palatable food product from soy protein.

To the accomplishment of the foregoing and related desiderata, the present invention then comprises the features hereinafter described and particularly pointed out in the claims, the following description setting forth in detail certain illustrative embodiments of the invention. The description is only indicative, however, of but a few of the various ways in which the principles of the invention may be employed.

Briefly stated, the present invention is directed to a food product, and process for producing same, in which oil is incorporated in the protein particle.

It is one of the discoveries of the present invention that the graininess of the normal protein oil system is due to the encapsulation of the protein particle by the oil with little or no penetration of the oil into the protein particle. Unless the oil can enter the protein particle and/or the protein molecule, nothing can be done to eliminate the graininess, unless water is added to the system. By introducing oil into the protein particle, the objectionable graininess is eliminated.

It is also one of the discoveries of the invention that high flavor levels can be produced using oil-soluble flavoring materials. High flavors can be produced by introducing oil-soluble flavors into the oil and protein composition described hereinabove. The oil-soluble flavors may be added to the oil prior to or after the addition of the protein. The result is a good product flavor even though low levels of flavor addition are employed.

Suitable flavoring materials include citric acid, which is solubilized in propylene glycol to form an oil-miscible flavoring mixture. For example, 0.1% to about 5% by weight of the total composition of citric acid may be dissolved in 0.1% or to about 20% by weight of the final composition of propylene glycol. This oil-soluble flavoring composition is then added to the oil and protein composition. The addition may be made to the oil prior to, or after, the addition of the protein.

To produce a soy protein product possessing the characteristics similar in texture to peanut butter, the protein must be modified by the introduction of oil into the protein particle. In carrying out the present invention, it has been found essential to introduce oil into the soy protein particle. This is accomplished by use of an attrition mill. An attrition mill introduces energy into the system and changes the nature of the product. Although it is not known what physical and/or chemical changes are accomplished, there is a distinct change in the texture. The mill produces a thick non-viscous to free flowing composition which, when it cools to room temperature, sets up into a paste resembling peanut butter.

The oils which may be used include corn oil, soybean oil, animal fats, cottonseed oil, although preference is given to corn oil for its flavor. The oils are normally liquid at ambient temperatures.

The purified soy protein that is used as an ingredient must contain an emulsifying agent such as lecithin or other specially prepared agents capable of being incorporated into the protein. This modified soy protein is presently available as a commercial industrial product.

The soy protein is employed in amounts of about 30% to about 60% by weight. The oil is employed in amounts of 30% to about 70% by weight. The mixture of oil and the soy protein, which may be modified as is indicated hereinabove, is subjected to the action of an attrition mill. The treatment by the mill may be carried on at room temperatures, however is is preferable to carry out the process at sufficiently high temperatures to create a free-flowing liquid composition.

Sweetness of the final product may be provided by blending sweetening agents such as powdered sugar, sucrose, fructose, dextrose, and the like. The sweetening agent addition may be made prior to the addition of the oil. Plasticity may be improved by the addition of monoglycerides in the amount of 0.5% to 6% by weight of the final product or by use of prepared shortenings. The coloring agents may be employed in amounts from about 0.01% to about 5% by weight. The coloring agents are preferably oil-soluble or oil-miscible.

To further facilitate understanding of the present invention there is given hereinafter an illustrative example of a specific embodiment. This example is however merely typical of the invention and is not to be construed as limiting the scope of the invention.

EXAMPLE I

The modified protein, sugar and salt are blended and placed in a mixer. The oil or fat is placed in a steam jacketed kettle and monoglycerides are added as needed. Heat is applied until solution is achieved. After removal of the heat, a solution of citric acid in propylene glycol is added and the mixture agitated. Following this the oil soluble flavor is added and the mixture is then added to the protein blend and mixed until well blended. Glycerol or other color solutions are added during the blending period. The blended mass is then comminuted in any of a variety of variable speed devices.

Other modes of applying the principles of the invention may be employed, change being made as regards the details described, provided the features stated in any of the following claims or the equivalent of such be employed.

I, therefore, particularly point out and distinctly claim as my invention:

1. A food product consisting essentially of an oil-in-protein composition containing oil soluble constituents comprising: an oil-in-unhydrated soy-protein composition having a paste-like consistency in which said oil is contained in the protein particles, said composition comprising from about 30% to about 70% by weight of an oil selected from the class consisting of edible animal and vegetable oils, and from about 30% to about 60% by weight of an unhydrated soy-protein.

2. The food product of claim 1 containing an oil-soluble flavoring material.

3. The food product of claim 2 in which said oil-soluble flavoring material is in the form of at least one water soluble compound modified by an oil-soluble carrier.

4. The process for preparing a food product which includes the steps of: incorporating oil into unhydrated soy-protein particles by subjecting from about 30% to about 70% by weight of an oil and from about 30% to about 60% by weight of an unhydrated soy-protein to comminution at elevated temperatures to maintain the oil in free-flowing condition, and introducing oil soluble flavoring materials thereinto.

5. The food product of claim 1 in which said oil is modified with monoglycerides.

6. The process of claim 4 wherein said oil is modified with monoglycerides.

7. The process of claim 4 wherein the unhydrated soy-protein particles contain an emulsifying agent.

References Cited

UNITED STATES PATENTS

| 1,384,681 | 7/1921 | Smith et al. | 99—140 |
| 3,346,390 | 10/1967 | Pichel et al. | 99—98 |

RAYMOND N. JONES, Primary Examiner

JAMES R. HOFFMAN, Assistant Examiner

U.S. Cl. X.R.

99—98